(12) United States Patent
Jung et al.

(10) Patent No.: US 8,790,482 B2
(45) Date of Patent: Jul. 29, 2014

(54) EXTERIOR FILM FOR HOME APPLIANCE AND ADHESION METHOD THEREOF

(75) Inventors: Hyungi Jung, Seoul (KR); Minju Son, Seoul (KR); Kyungdo Kim, Seoul (KR); Hyunwoo Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 13/386,144

(22) PCT Filed: Aug. 11, 2010

(86) PCT No.: PCT/KR2010/005259
§ 371 (c)(1),
(2), (4) Date: Jan. 20, 2012

(87) PCT Pub. No.: WO2011/019198
PCT Pub. Date: Feb. 17, 2011

(65) Prior Publication Data
US 2012/0114892 A1 May 10, 2012

(30) Foreign Application Priority Data
Aug. 11, 2009 (KR) .................. 10-2009-0073616

(51) Int. Cl.
*B29C 65/00* (2006.01)
*B32B 37/00* (2006.01)
*B32B 38/00* (2006.01)

(52) U.S. Cl.
USPC ........... 156/257; 156/239; 156/248; 156/268; 156/270

(58) Field of Classification Search
USPC ......... 156/248, 249, 252, 256, 257, 268, 269, 156/270, 289, 71, 247, 250, 253, 267, 277, 156/230, 233, 234, 235, 239; 428/41.8, 428/40.1
See application file for complete search history.

(56) References Cited

U.S. PATENT DOCUMENTS

| 4,153,496 | A  | * | 5/1979  | Swift ............................ 156/384 |
| 4,328,057 | A  | * | 5/1982  | Gutow ........................... 156/248 |
| 4,543,139 | A  | * | 9/1985  | Freedman et al. ............ 156/152 |
| 5,580,411 | A  | * | 12/1996 | Nease et al. .................. 156/260 |
| 6,322,655 | B1 | * | 11/2001 | Casagrande .................. 156/257 |
| 6,479,142 | B1 |   | 11/2002 | Condon et al. ................ 428/354 |
| 2006/0019051 | A1 | * | 1/2006 | Pufahl .......................... 428/40.1 |
| 2006/0040081 | A1 | * | 2/2006 | Hodsdon et al. ............. 428/40.1 |

FOREIGN PATENT DOCUMENTS

| CN | 1291944 | 4/2001 | |
| DE | 100 40 490 A1 | * 2/2002 | ............. B32B 18/00 |
| GB | 2 331 175 A | * 5/1999 | ............... G09F 7/16 |
| JP | 09-277791 A | 10/1997 | |

(Continued)

OTHER PUBLICATIONS

Chinese Office Action issued in Application No. 201080034472.9 dated May 24, 2013.

(Continued)

*Primary Examiner* — Linda L Gray
(74) *Attorney, Agent, or Firm* — KED & Associates, LLP

(57) ABSTRACT

An exterior film for a home appliance includes a cut portion formed by half-cutting corresponding to a see-through portion formed at an exterior part of the home appliance. After the exterior film is adhered, the cut portion is removed along with removal of a sub adhesive protection film. Accordingly, operability and productivity during manufacturing of the exterior film are improved.

2 Claims, 3 Drawing Sheets

(56) References Cited

FOREIGN PATENT DOCUMENTS

| JP | 2001-152073 A | | 6/2001 | |
| JP | 0200227786 | * | 9/2002 | ............ G02F 1/1333 |
| JP | 2005-231337 A | | 9/2005 | |
| KR | 10-2001-0041530 A | | 5/2001 | |

OTHER PUBLICATIONS

International Search Report issued in PCT Application No. PCT/KR2010/005259 dated May 20, 2011.

* cited by examiner

EXTERIOR FILM FOR HOME APPLIANCE AND ADHESION METHOD THEREOF

TECHNICAL FIELD

The present disclosure relates to an exterior film for a home appliance and an adhesion method thereof.

BACKGROUND ART

Generally, home appliances such as a refrigerator, a washing machine, a cooking device, an air conditioner, and a dish washer are constructed by a main body or a door made of a steel plate or a plastic material. The main body or the door may present various colors, feels, or patterns.

As the standard of living improves and according to consumers tastes, the home appliances have been advanced and differentiated by their designs. Especially in recent days, since design of the home appliances as well as the function has a great influence on purchase decision, the home appliances are being introduced with more diverse patterns, colors, and feelings.

Typically, a vinyl coated metal (VCM) steel printed with various colors and patterns or a tempered glass capable of presenting more various colors and feels with a luxurious image are used for an exterior member constituting the main body or the door of the home appliances. As the VCM steel or the tempered glass is used as the exterior member to partly or wholly form the exterior of the home appliances, the overall appearance of the home appliances can be advanced and differentiated.

In recent days, the tempered glass with various colors and patterns is used more and more as the exterior member forming at least a part of the main body or the door. Users care for the tempered glass due to its particular feeling, and various colors and patterns.

When using the tempered glass as the exterior member, colors and patterns are printed usually by silk screen. However, the process of the silk screen is not continuous nor quick. Furthermore, the silk screen is inefficient since it has a high defective rate while requiring high manufacturing cost.

To overcome such limits and improve the operability, there has been developed a method that prints colors and patterns on a film material by gravure printing and then adheres the printed film material to an exterior member made of tempered glass.

DISCLOSURE OF INVENTION

Technical Problem

Embodiments provide an exterior film for a home appliance, capable of being adhered to an exterior part and then removed along with a protection film by forming a cut portion of the exterior film by half-cutting corresponding to a see-through portion formed at the exterior part of the home appliance.

Embodiments also provide a method of adhering an exterior film for a home appliance, the exterior film capable of being adhered to an exterior part and then removed along with a protection film by forming a cut portion of the exterior film by half-cutting corresponding to a see-through portion formed at the exterior part of the home appliance.

Solution to Problem

In one embodiment, an exterior film for a home appliance includes a main film printed with colors or patterns to form an exterior of the home appliance, a main adhesive applied to an upper surface of the main film to enable adhesion of the main film to an exterior part of the home appliance, a main adhesive protection film provided to an upper surface of the main adhesive and removed before the adhesion of the main film, a sub adhesive applied to a lower surface of the main film, and a sub adhesive protection film adhered to the lower surface of the main film by the sub adhesive and removed after the adhesion of the main film, wherein a cut portion is further formed by cutting a part of a laminate structure of the main adhesive protection film, the main film, and the main adhesive is cut corresponding to a see-through portion formed at the home appliance to be removed along with removal of the sub adhesive protection film.

In another embodiment, an adhesion method of an exterior film for a home appliance includes forming a main film printed with colors or patterns, applying a main adhesive to an upper surface of the main film and adhering a main adhesive protection film thereto, applying a sub adhesive to a lower surface of the main film and adhering a sub adhesive protection film thereto, half-cutting a cut portion including the main adhesive protection film, the main adhesive, and the main film corresponding to a see-through portion formed at the home appliance to be seen through from the outside, removing the main adhesive protection film, adhering the main film to the home appliance by the main adhesive, and removing the sub adhesive protection film along with the sub adhesive and the cut portion.

The details of one or more embodiments are set forth in the accompanying drawings and the description below. Other features will be apparent from the description and drawings, and from the claims.

Advantageous Effects of Invention

According to the exterior film for a home appliance and an adhesion method thereof in accordance with the embodiment, a cut portion of the exterior film which corresponds to a see-through portion formed at an exterior part of the home appliance is half-cut by a Thomson press.

Here, since the cut portion is disposed at an upper part of the exterior film except for a sub adhesive protection film which forms a lowermost part of the exterior film, the cut portion may be removed along with the sub adhesion protection film after adhesion of the exterior film.

Accordingly, not only is the manufacturing process of the exterior part simplified but also operability and productivity may be improved since removal of the cut portion corresponding to the see-through portion is facilitated.

MODE FOR THE INVENTION

Reference will now be made in detail to the embodiments of the present disclosure, examples of which are illustrated in the accompanying drawings.

Figure 1:
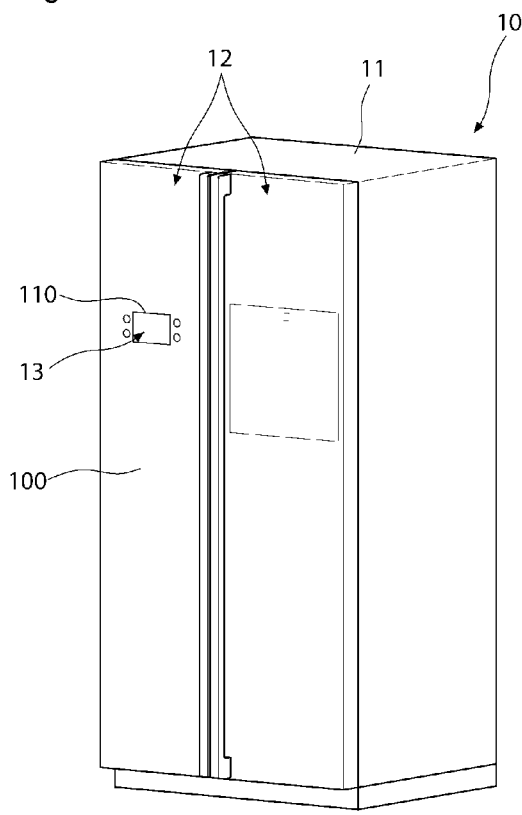
FIG. 1 is a perspective view of a refrigerator applying an exterior film for a home appliance according to the embodiment.

FIG. 1 is a perspective view of a refrigerator applying an exterior film for a home appliance according to the embodiment.

Referring to FIG. 1, the exterior of the refrigerator 10 is constituted by a main body 11 which forms a storage space and a refrigerator door 12 which opens and closes the storage space.

A front surface of the refrigerator door 12 is equipped with an exterior part 100 made of tempered glass. A rear surface of the exterior part 100 made of the tempered glass may be attached with a main film 210 printed with colors or patterns to be shown to the outside, as one component of the exterior film 200 that will be described below.

The refrigerator door 12 includes a see-through portion 110 equipped with a display 13. Since the main film 210 is not adhered to the see-through portion 110, the display 13 can be seen through from the outside of the exterior part 100 after the display 13 is mounted. In addition, the display 13 may include operational buttons.

Figure 2:
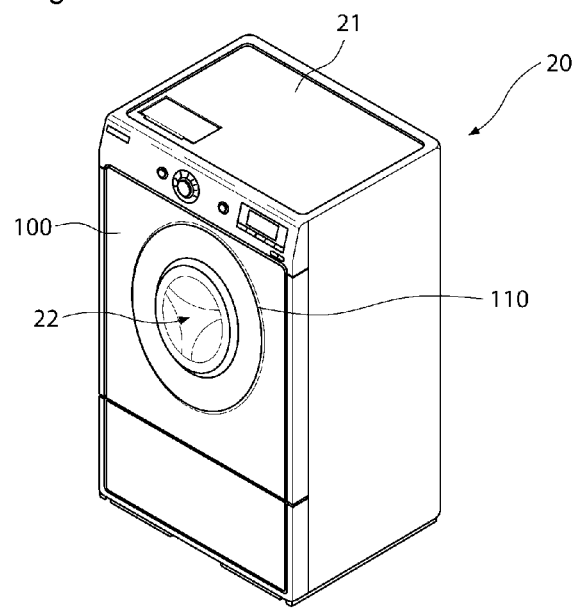
FIG. 2 is a perspective view of a washing machine applying the exterior film according to the embodiment.

FIG. 2 is a perspective view of a washing machine applying the exterior film according to the embodiment.

Referring to FIG. 2, the exterior of the washing machine 20 is constituted by a main body 21 which supplies a space therein for washing of laundry, and a door 22 which opens and closes the washing space of the main body 21.

The door 22 is disposed on a front surface of the main body 21. At least a part of the door 22 may be made of a transparent material to allow inspection of the inside.

The front surface of the main body 21 may be constructed by the exterior part 100 made of tempered glass, more specifically, except for a portion corresponding to the door 22. The rear surface of the exterior part 100 made of the tempered glass may be attached with the main film 210 printed with colors or patterns to be shown to the outside, as one component of the exterior film 200 that will be described below, thereby forming the exterior of the main body 21.

The see-through portion 110 in the form of an opening may be disposed in a center of the exterior part 100 corresponding to a position of the door 22. Therefore, the washing space in the main body 21 may be seen through the door 22. The main film 210 may be adhered to the whole rear surface of the exterior part 100 except for a portion corresponding to the see-through portion 110.

Figure 3:
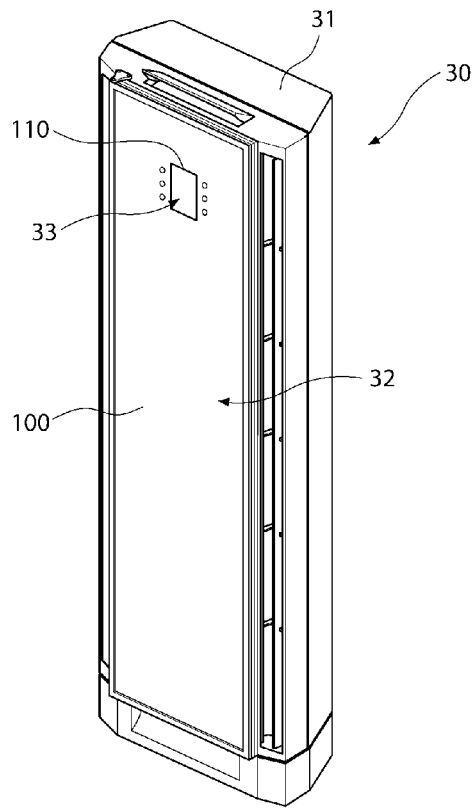
FIG. 3 is a front view of an air conditioner applying the exterior film according to the embodiment.

FIG. 3 is a front view of an air conditioner applying the exterior film according to the embodiment.

Referring to FIG. 3, the exterior of the air conditioner is constituted by a main body 31 receiving parts such as an evaporator and a fan motor assembly. A front cover 32 including the exterior part 100 made of tempered glass is provided to a front surface of the main body 31. The front cover 32 is adapted to open and close inside of the main body 31.

The main film 210 printed with colors and patterned to be shown to the outside may be adhered to the rear surface of the exterior part 100, as one component of the exterior film 200 as will be described below.

Additionally, the exterior part 100 may include a display 33. The display 33 may be manipulated for the operation of the air conditioner while displaying the operational state of the air conditioner. The display 33 may be checked from the outside through the see-through portion 110 of the exterior part 100.

Thus, the main film 210 may be adhered to the whole rear surface of the exterior part 100 except for a portion corresponding to the see-through portion 110, thereby forming the exterior of the air conditioner 30.

FIGS. 4 through 8 are sectional views explaining the structure and an adhesion method of the exterior film according to the embodiment.

Referring to FIGS. 4 through 8, the exterior film 200 may include a main adhesive protection film 230, a main adhesive 220, the main film 210, a sub adhesive 240, and a sub adhesive protection film 250, so as to be adhered to the rear surface of the exterior part 100 made of a transparent or translucent material such as tempered glass.

More specifically, the main film 210 may be formed by printing colors or patterns to be shown to the outside on a film material such as polyethylene terephthalate (PET) and polyvinyl chloride (PVC) by gravure printing.

A coating layer may be formed on an upper surface or a lower surface of the main film 210 to protect the gravure-printed surface. Alternatively, a supplementary layer may be further provided at the lower surface of the main film 210 to emphasize or transform the printed colors or patterns.

If necessary, an ink mixed with metal flakes may be printed on the main film 210 when intended to present metallic feeling or pearl feeling.

The main adhesive 220 is applied to an upper surface of the main film 210. The main adhesive 220 enables the main film 210 to adhere to the rear surface of the exterior part. For this purpose, general adhesives for films may be used as the main adhesive 220. The main adhesive 220 may further contain metal flakes to preset metallic feeling if necessary.

The main adhesive protection film 230 may be provided to the upper surface of the main film 210. The main adhesive protection film 230 is adapted to prevent damage of the main adhesive 220 during manufacturing and distribution of the exterior film 200 and may be formed of a resin material such as PET and PVC.

The main adhesive protection film 230 may be removed when the main film 210 is adhered to the exterior part 100, remaining a portion corresponding to the cut portion 300 so that the main adhesive 220 is exposed through an upper surface of the exterior film 200.

The sub adhesive 240 is applied to the lower surface of the main film 210 for adhesion of the sub adhesive protection film 250. After the main film 210 is adhered to the exterior part 100, the sub adhesive 240 is removed along with the sub adhesive protection film 250.

The sub adhesive 240 may be made of the same material as the main adhesive 220. Also, the sub adhesive protection film 250 may be made of the same material as the main adhesive protection film 230.

The cut portion 300 is formed at the exterior film 200. The cut portion 300 is disposed at a position corresponding to the see-through portion 110 of the exterior part 100 when the main film 210 is adhered to the rear surface of the exterior part 100. In addition, the cut portion 300 is half-cut by a Thomson press 400 to be removed altogether.

More specifically, the cut portion 300 is removed after adhesion of the main film 210. Since the cut portion 300 is removed, the see-through portion 110 of the exterior part 100 can be seen through although the main film 210 is adhered thereto.

The cut portion 300 is shaped and positioned corresponding to the see-through portion 110. The cut portion 300 is configured so that the main adhesive protection film 230, the main adhesive 220, the main film 210, and the sub adhesive 240 are partly cut out by the Thomson press 400.

Specifically, the cut portion 300 is half-cut by a broken line by the Thomson press 400 and disposed at the corresponding position of the exterior film 200. As the sub adhesive protection film 250 is pulled, the cut portion 300 is removed from the exterior film 200 along with the sub adhesive protection film 250.

The cut portion 300 has a shape corresponding to a shape of the see-through portion 110. Therefore, when the main adhesive protection film 230 is removed for adhesion of the main film 210, only a part of the main adhesive protection film 230 corresponding to the cut portion 300 remains.

After the main film 210 is adhered, the cut portion 300 may be removed along with the sub adhesive 240 and the sub adhesive protection film 250 by an operation of removing the sub adhesive protection film 250.

The cut portion 300 is half-cut from an upper surface of the main adhesive protection film 230 by the Thomson press 400. Here, the cut portion 300 is half-cut up to the main adhesive 220, the main film 210, and the sub adhesive 240.

However, alternatively, the cut portion 300 may be cut to include only the main adhesive protection film 230, the main adhesive 220, and the main film 210. In this case as well, the cut portion 300 may be removed along with removal of the sub adhesive 240 and the sub adhesive protection film 250.

Hereinafter, the manufacturing process and the adhesion method of the above-structured exterior film for a home appliance according to the embodiment will be explained with reference to the drawings.

Figure 9:
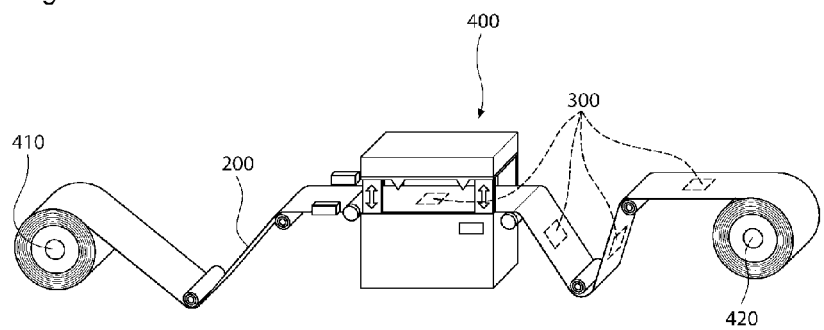
FIGS. 9 and 10 are schematic views showing the manufacturing process of the exterior film according to the embodiment.
Figure 10:
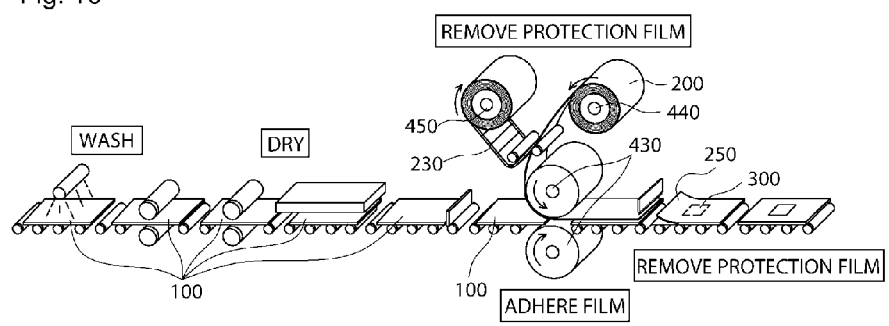

FIGS. 9 and 10 are schematic views showing the manufacturing process of the exterior film according to the embodiment.

Referring to FIGS. 9 and 10, the exterior film 200 is manufactured by applying the main adhesive 220 to the upper surface of the main film 210 gravure-printed with colors or patterns, adhering the main adhesive protection film 230 on the main adhesive 220, applying the sub adhesive 240 to the lower surface of the main film 210, and adhering the sub adhesive protection film 250 on the sub adhesive 240.

The exterior film 200 is wound on a supply winder 410 in a roll form and continuously fed to the Thomson press 300. Simultaneously with the continuous feeding of the exterior film 200, the cut portion 300 is formed at the exterior film 200 by the Thomson press 400.

The cut portion 300 is formed by half-cutting the main adhesive protection film 230, the main adhesive 220, the main film 210, and the sub adhesive protection film 240 of the exterior film 200 altogether into the shape corresponding to the see-through portion 110 of the exterior part 100.

The exterior film 200 passed through the Thomson press 400 is wound again into a roll form on a winder 420 for storage and transportation.

The exterior part 100, being made of tempered glass, is cut into a desired size, washed to remove impurities, and dried. The exterior part 100 thus washed and dried is passed through a compression roller 430 so that the main film 210 of the exterior film 200 is adhered thereto.

More specifically, before the exterior part 100 is passed through the compression roller 430, the main adhesive protection film 230 of the exterior film 200 wound on the supply winder 440 is wound on a film separation winder 450, thereby being separated from the exterior film 200. According to this, the exterior film 200 is fed to the exterior part 100 without the main adhesive protection film 230, and then adhered to the exterior part 100 while passing through the compression roller 430.

After the exterior film 200 passes through the compression roller 430, the sub adhesive protection film 250 is removed, thereby separating the cut portion 300 at this time. Accordingly, the see-through portion 110 of the exterior part 100 can be seen through. Thus, manufacturing of the exterior part 100 with the main film 210 adhered thereto is completed.

An exterior film manufacturing method and a main film adhesion method will be more specifically described with reference to FIGS. 4 through 8. First, the main film 210 is formed by performing the gravure printing on a resin stencil paper which is the material of the main film 210. Here, the main film 210 may further include, besides the gravure-printed layer, a protection layer for protecting the gravure-printed layer and the supplementary layer for emphasizing the printed colors or patterns.

Figure 4:
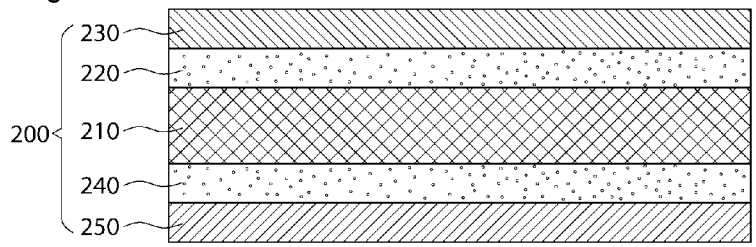
FIGS. 4 through 8 are sectional views explaining the structure and an adhesion method of the exterior film according to the embodiment.

The main adhesive 220 is applied to the upper surface of the main film 210. The main adhesive protection film 230 is adhered by the main adhesive 220. The sub adhesive 240 is applied to the lower surface of the main film 210 and the sub adhesive protection film 250 is adhered by the sub adhesive 240. Thus, the exterior film 200 is manufactured as shown in FIG. 4.

Figure 5:
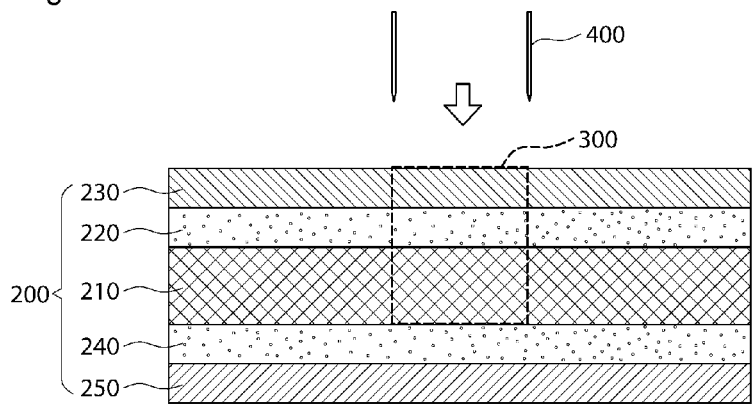

As shown in FIGS. 5 and 9, the thus-manufactured exterior film 200 is half-cut by the Thomson press 400 to form the cut portion 300. The cut portion 300 is formed by a broken line from the upper surface of the main adhesive protection film 230 up to the sub adhesive 240. The cut portion 300 is removed along with removal of the sub adhesive protection film 250.

After the cut portion 300 is formed, the main adhesive protection film 230 of the exterior film 200 is removed, thereby exposing the main adhesive 220 except for the portion corresponding to the cut portion 300 so that the main adhesive 220 can be adhered to the rear surface of the exterior part 100.

Figure 6:
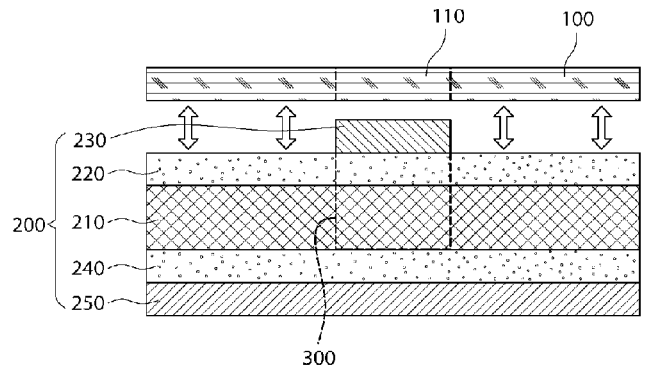

In this state, the exterior film 200 is adhered to the rear surface of the exterior part 100 as shown in FIG. 6. In the state of FIG. 6, the main adhesive 220 except for the portion corresponding to the cut portion 300 is adhered to the rear surface of the exterior part 100. Here, since the main adhesive protection film 230 forming the cut portion 300 is in contact with the exterior part 100, the cut portion 300 is not adhered to the exterior part 100.

Figure 7:
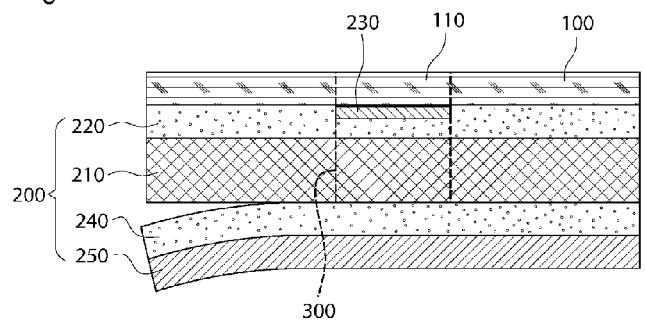
Figure 8:
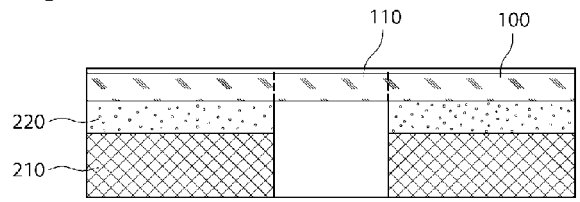

In this state, when the sub adhesive protection film 250 is removed as shown in FIGS. 7 and 10, the sub adhesive 240 with the sub adhesive protection film 250 adhered thereto is also removed. In addition, the cut portion 300 adhered to the sub adhesive protection film 250 by the sub adhesive protection film 240 is also removed.

That is, the main film 210, the main adhesive adhered to the main film 210, and the sub adhesive protection film 230 corresponding to the cut portion 300 are not adherent to the exterior part 100 but adhered to the sub adhesive protection film 250 so as to be removed along with removal of the sub adhesive protection film 250.

As described above, as shown in FIG. 8, the sub adhesive 240 and the cut portion 300 can be removed from the exterior film 200 by one-time operation of removing the sub adhesive protection film 250 so that the main film 210 is adhered to the exterior part 100 by the main adhesive 220. Here, the cut portion 300 is disposed corresponding to the see-through portion 110 of the exterior part 100.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the embodiment, since a cut portion of an exterior film corresponding to a see-through portion of an exterior part of a home appliance is half-cut, the cut portion may be removed along with removal of a sub adhesive protection film after the exterior film is adhered. As a result, the operability and the productivity are improved. That is, the industrial applicability is extremely high.

The invention claimed is:

1. An adhesion method of an exterior film for a home appliance, comprising:
    forming the exterior film, comprising:
        forming a main film printed with colors or patterns;
        applying a main adhesive to an upper surface of the main film;
        adhering a main adhesive protection film to an upper surface of the main adhesive;
        applying a sub adhesive to a lower surface of the main film; and
        adhering a sub adhesive protection film to a lower surface of the sub adhesive;
    half-cutting a cut portion of the exterior film corresponding to a see-through portion of the home appliance, comprising cutting corresponding portions of the main adhesive protection film, the main adhesive, and the main film without cutting the sub adhesive and the sub adhesive protection film, such that the cut portion remains integral with the sub adhesive and the sub adhesive protection film;
    removing the main adhesive protection film after half-cutting the cut portion, wherein a portion of the main adhesive protection film at the cut portion remains adhered while a remaining portion of the main adhesive protection film is removed before adhering the main film to the home appliance;
    adhering the main film to the home appliance by the main adhesive after removing the remaining portion of the main adhesive protection film, wherein the portion of the main adhesive protection film remaining at the cut portion and the main adhesive are in close contact with the home appliance and wherein the cut portion corresponds to the see-through portion of the home appliance; and
    removing the sub adhesive protection film-along after adhering the main film to the home appliance,
    wherein the sub adhesive protection film is removed integrally with the sub adhesive, a portion of the main film at the cut portion, a portion of the main adhesive at the cut portion and the portion of the main adhesive protection film at the cut portion.

2. The adhesion method according to claim 1, wherein the colors or patterns are gravure-printed on a surface of the main film such that the colors or patterns are visible from an exterior of the home appliance when the main film is adhered to the home appliance.

* * * * *